US012783675B2

(12) United States Patent
Sarkar et al.

(10) Patent No.: US 12,783,675 B2
(45) Date of Patent: Nov. 3, 2026

(54) USAGE MODEL CONTEXT AWARE POWER MANAGEMENT IN SECURE SYSTEMS WITH EMBEDDED HARDWARE SECURITY MODULES

(71) Applicant: Micron Technology, Inc., Boise, ID (US)

(72) Inventors: Sourin Sarkar, Bangalore (IN); Vamshikrishna Komuravelli, Rangareddy (IN)

(73) Assignee: Micron Technology, Inc., Boise, ID (US)

( * ) Notice: Subject to any disclaimer, the term of this patent is extended or adjusted under 35 U.S.C. 154(b) by 597 days.

(21) Appl. No.: 17/939,551

(22) Filed: Sep. 7, 2022

(65) Prior Publication Data

US 2024/0078314 A1 Mar. 7, 2024

(51) Int. Cl.
*G06F 21/57* (2013.01)
*G06F 21/73* (2013.01)

(52) U.S. Cl.
CPC ............ *G06F 21/572* (2013.01); *G06F 21/73* (2013.01); *G06F 2221/034* (2013.01)

(58) Field of Classification Search
CPC ... G06F 21/572; G06F 21/73; G06F 2221/034
See application file for complete search history.

(56) References Cited

U.S. PATENT DOCUMENTS

| | | | | |
|---|---|---|---|---|
| 11,429,289 | B2 * | 8/2022 | Kotary | G06F 9/4406 |
| 2010/0094496 | A1 * | 4/2010 | Hershkovitz | B60L 50/66 701/22 |
| 2017/0250996 | A1 * | 8/2017 | Oz | H04L 63/14 |
| 2022/0391090 | A1 * | 12/2022 | Muthiah | G06N 5/022 |
| 2023/0068365 | A1 * | 3/2023 | Kim | G06F 1/329 |
| 2023/0236652 | A1 * | 7/2023 | Moshe | G06F 1/3203 713/320 |
| 2024/0111354 | A1 * | 4/2024 | Srivastava | G06F 1/3287 |

* cited by examiner

*Primary Examiner* — Christopher B Robinson
*Assistant Examiner* — Tania M Pena-Santana
(74) *Attorney, Agent, or Firm* — Greenberg Traurig

(57) ABSTRACT

A system for providing usage model context aware power management in secure systems with embedded hardware security modules is disclosed. The system determines a context associated with a transaction with a memory device that is initiated by a host device. Based on the context, the system sets conditions within its internal data structures and state machines. The context may indicate that the transaction is a secure transaction requiring cryptographic services of the memory device. Flags are set in firmware of the memory device indicating a need for context aware power management and for cryptographic services. If a power management function to reduce power to the memory device is to be executed, the firmware rejects the transaction until the memory device reenters a functional mode. If the function is not to be executed, the firmware provides the host with a notification of an impending power state change for the memory device.

20 Claims, 9 Drawing Sheets

USAGE MODEL CONTEXT AWARE POWER MANAGEMENT IN SECURE SYSTEMS WITH EMBEDDED HARDWARE SECURITY MODULES

FIELD OF THE TECHNOLOGY

At least some embodiments disclosed herein relate to memory devices in general, and more particularly, but not limited to, a system for providing usage model context aware power management in secure systems with embedded hardware security modules.

BACKGROUND

Typically, a computing device or system includes one or more processors and one or more memory devices, such as memory chips or integrated circuits. The memory devices may be utilized to store data that may be accessed, modified, deleted, or replaced. The memory devices may be, for example, non-volatile memory devices that retain data irrespective of whether the memory devices are powered on or off. Such non-volatile memories may include, but are not limited to, read-only memories, solid state drives, and NAND flash memories. Additionally, the memory devices may be volatile memory devices, such as, but not limited to, dynamic or static random-access memories, which retain stored data while powered on, but are susceptible to data loss when powered off. Based on receipt of an input, the one or more processors of the computing device or system may request that a memory device of the computing system retrieve stored data associated with or corresponding to the input. In certain scenarios, the data retrieved from the memory device may include instructions, which may be executed by the one or more processors to perform various operations and may include data that may be utilized as inputs for the various operations. In instances where the one or more processors perform operations based on instructions from the memory device, data resulting from the performance of the operations may be subsequently stored into the memory device for future retrieval.

Certain memory devices include embedded hardware security modules that utilize physically unclonable functions to derive keys and identities that are utilized to authorize a host to communicate with the memory device. For such memory devices, effectively managing memory device power modes is important to ensure that cryptographic services provided by the memory devices are not disrupted. Such cryptographic services typically require more power than provided by a memory device in low power or standby mode. For example, if a memory device enters low power or standby mode and cryptographic services are currently being conducted, the entry into low power or standby mode often causes the memory device to lock up and the host interacting with the memory device loses the capability to communicate with the memory device. As a result, the only recover path from such as scenario is to conduct a device power cycle, which is often not acceptable. Based at least on the foregoing, providing functionality associated with mitigating such disruptions and adding additional protection for memory devices will enhance user experiences with memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
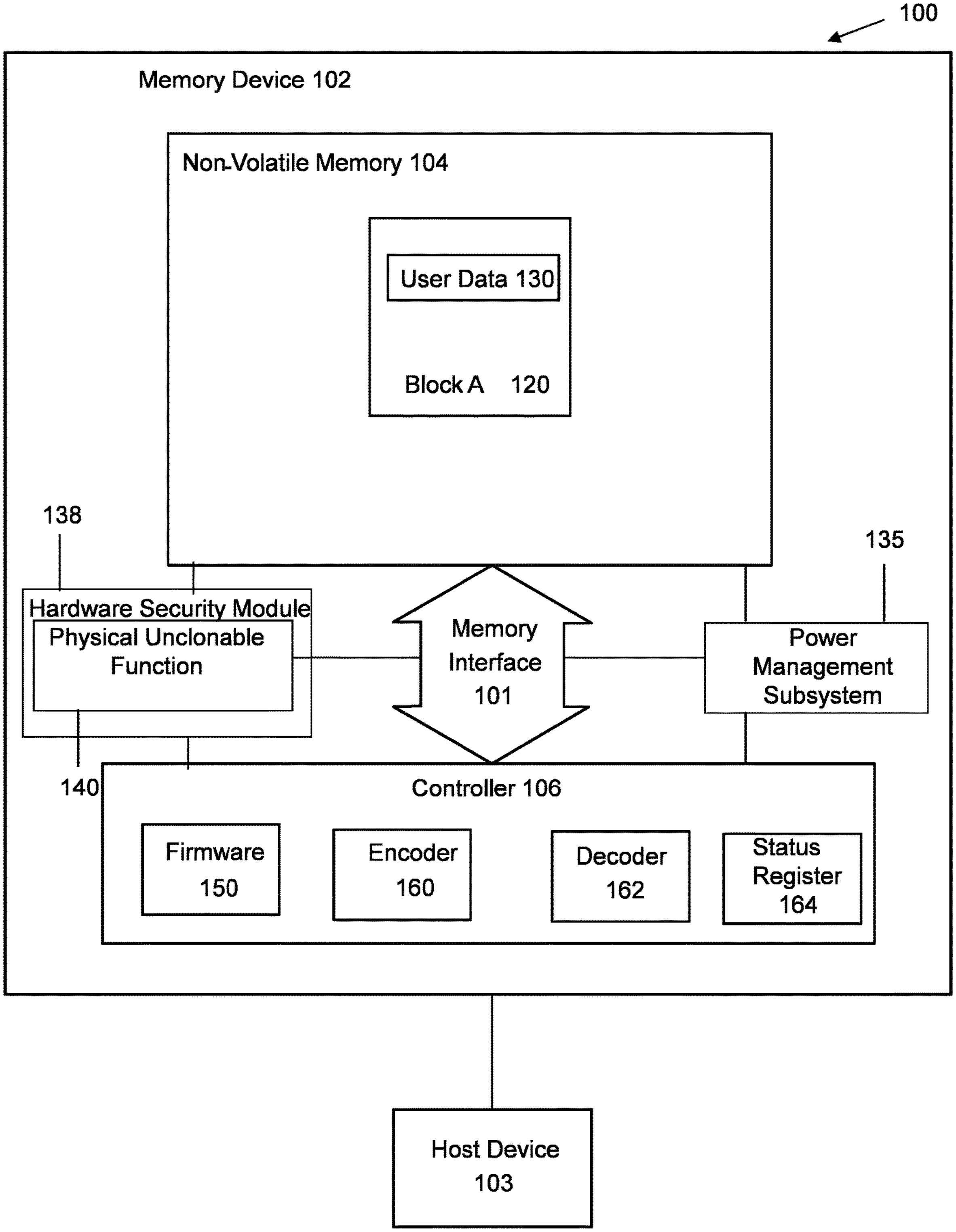
FIG. 1 shows a memory device and host device for supporting usage model context aware power management in secure systems with embedded hardware security modules in accordance with embodiments of the present disclosure.

The following disclosure describes various embodiments for providing usage model context aware power management in secure systems with embedded hardware security modules. At least some embodiments of the present disclosure relate to memory devices and reducing disruption to interactions between host devices and memory devices that may result from execution of power management functions of power management subsystems of such memory devices. Certain interactions and transactions initiated by a host device may require the use of cryptographic services provided by the memory devices that interact with the host device. Memory devices with embedded hardware security modules are capable of not only handling transactions or requests from host devices relating to traditional memory operations, such as, reading data stored in the memory device, writing data to the memory device, and erasing data stored in the memory device, but are also capable of handling secure transactions that require cryptographic functions that are dependent on the memory device hardware. For example, such memory devices may utilize hardware security modules that utilize physical unclonable functions (PUFs) to derive various keys and identities to facilitate secure operations between a host and memory device. PUFs may be physical components within a memory device that, for a particular input and conditions, provides a physically defined output response that serves as a unique identifier for the memory device.

For memory devices including embedded hardware security modules that incorporate technologies, such as PUF, it is important to effectively manage memory device power modes effectively so that power management functions initiated or provided by power management subsystems do not disrupt the cryptographic services that are provided for secure transactions or interactions between hosts and memory devices. For example, in memory devices that utilize PUF or other similar functions, the memory device will need enough power supplied to a specific memory region of the memory device to derive the PUF data (e.g., keys, authentication information, identities, etc.) to support the secure operations requested by the host. In certain scenarios, the PUF data may be used to feed into functions utilized for key and identity derivation, for example. For secure transactions initiated by host devices for memory devices, the cryptographic services (i.e., provided by cryptographic functions) required for such secure transactions are dependent on device hardware, which, if disrupted by power management functions, often cause the memory devices to lock up. Additionally, power disruption (e.g., the memory device enters a standby mode or low power mode) may also cause the host to lose the capability to communicate with the memory device to complete the secure transaction. Typically, the way to recover from such a scenario is to initiate a memory device power cycle to reboot the memory device. Having to power cycle the memory device each time a power disruption occurs is not only wasteful and contributes to wear and tear of the memory device, but also is not acceptable to customers that may require minimal disruption for the specific types of memory operations that their applications require. For example, use-case scenarios requiring long-running secure input output read and write operations (e.g., streaming encrypted movie data)

According to embodiments of the present disclosure, systems, apparatuses, and methods are disclosed herein that provide usage model context aware power management in secure systems with embedded hardware security models. In certain embodiments, the systems, apparatuses, and methods enable a memory device to become usage model context aware, utilize a power management algorithm of the memory device to use the context awareness as a decision-making parameter (e.g., for transactions and interactions between the memory device and a host device), utilize a cryptographic safe power management, and provide for a host notification mechanism, such as through a status register and response packets from the memory device, to notify the host that an impending move from a fully functional power mode to a low power or standby mode has been postponed and outstanding. The functionality provided by the systems, apparatuses, and method described herein protect cryptographic firmware engine failure, such as during long-running secure transactions with a host, alert a host about impending power state changes that may impact cryptographic firmware engines, prevent memory hardware lockups for the memory device due to unserved cryptographic functions, assist in overcoming hardware response timeouts without the need for a power cycle, and facilitate continuous uptime for the memory device.

In certain embodiments, the usage model context awareness may be facilitated through the use of a usage model context awareness module that may reside within the firmware of the memory or in other locations of the memory device. The module may comprise logic that may be configured to detect a context in which a transaction is initiated with the memory device by a host device. In certain embodiments, the firmware of the memory device may include the usage model context awareness module and may be configured to detect the nature of the transaction initiated by the host device. For example, the firmware may be configured to detect whether the transaction is a standard operation (e.g., an operation that does not require cryptographic security services) or a secure operation (e.g., an operation requiring cryptographic security services provided by the memory device). Based on the context of the transaction, the firmware may be configured to set certain conditions with the firmware internal data structures and state machines corresponding to the context of the transaction. In certain embodiments, the setting of the conditions enables the memory device firmware to become context aware. Based on the context awareness of the firmware, the power management subsystem of the memory device may be configured to function.

As an illustrative example, if the transaction that a host device initiates is a secure read operation to read data stored in the memory device, the usage model context awareness module may be configured to enter a secure read awareness mode based on the detected context of the transaction (i.e., the context indicates that the transaction requires cryptographic security services and functionality). While in the secure read awareness mode, the module may determine that it requires certain hardware security functions for the cryptographic supporting the secure read transaction to function. The module may also determine, based on the context, that a move to a low power state or to a standby state would cause disruption to the memory device if the transaction is processed during a low power or standby state. Based on at least the foregoing, the module may set up specific flags within the memory device to let the firmware know that a secure read transaction is in progress, that n-number of requests and responses can happen during the transaction, that a secure response needs to be sent to the host at the end of transaction to conclude the secure read operation.

As another illustrative example, the host device may initiate a transaction including a long input output operation that consists of thousands of small write operations, which are conduct at a slow, but periodic rate. For example, the host device may seek to save securely encrypted video camera streaming data onto the memory device. The usage model context awareness module may analyze the transaction and determine that the transaction requires cryptographic services of the memory device. Based on the detection, the firmware or usage model context awareness module may cause the memory device to enter into a usage context model awareness state. Once in the state, the memory device (e.g. via the firmware) will know the nature of the operation associated with the transaction, the periodicity of the write operations, and other information associated with operations of the transaction. The module may be configured to set up internal flags and perform internal calculations to ensure than abrupt power management function of the memory device does not cause a disruption in the write process of the transaction. In certain embodiments, the usage model context awareness module may be configured to monitor secure transactions that require cryptographic service functionality to complete operations associated with a host requested transaction. Based on the awareness, the module may be configured to set flags in the firmware and indicators in the code of the firmware to back off (e.g., pause) the power management system.

In certain embodiments, the systems, apparatuses, and methods may also include a context aware power management module. In certain embodiments, the functionality of the context aware power management module may depend on the usage model context awareness module. In certain embodiments, firmware has learned and is aware of the context associated with a particular transaction, the firmware may be configured to remember (e.g. save in a state of the memory device) the current context. Based on the requirement (e.g., for cryptographic service functionality) for completing the transaction in the current context, the firmware, such as through the context aware power management module may be configured to set internal data structures accordingly. In certain embodiments, when the power management subsystem of the memory device is triggered (e.g., asynchronously), the context aware power module may be triggered and the context aware power module may determine whether to allow or disallow the impending power management action (e.g., moving the memory device from a full power mode to a low power or standby mode).

In certain embodiments, if the context aware power management module determines to allow the execution of the power management function, then the firmware may be configured to reject any host command and associated transaction during the transition between power states of the memory device that may require cryptographic services, which would require full power or at least more power than is supplied at standby or low power mode. Once the transition to the low power or standby mode is completed and the memory device enters the low power or standby mode, algorithms of the memory device may be utilized to get the memory device back into the functional mode. When the memory device comes back to functional mode from the low power or standby mode and there is a need for cryptographic function usage, the firmware may be configured to ensure that checks are used to ensure the availability of full power (or enough power) to the memory device hardware sufficient for cryptographic function execution by the memory device. On the other hand, if the context aware power management module determines to not allow the execution of the power management function, the firmware may be configured to respond to the host device with a notification that an impending power state change for the memory device exists.

In certain embodiments, the systems, apparatuses, and methods may also include a cryptographic safe power management module. In certain embodiments, the cryptographic safe power management module of the memory device may ensure that enough time is provided to the internal memory cryptographic functions to be safely offloaded, loaded, and initialized before or after power management by the power management function of the power management subsystem. In certain embodiments, the cryptographic functions may be functions that may need physical memory of the memory device for PUF-related functions (e.g., generating keys, identifiers, etc.) in certain embodiments, parameters for time delays and retry mechanisms may be based on the usage model context aware learning conducted within the firmware. In certain embodiments, the systems, apparatuses, and methods may also include providing host notifications of impending power management. For example, when an impending power management state change to low power or standby mode is detected by the memory device, the context aware power management module may be configured to prevent the power management function to be executed. In such a scenario, the host device may be notified by status bits (e.g., status bits stored in a status register of the memory device) that an impending power management event has been postponed. The notification may be utilized to let the host device know that until the secure transaction context associated with the transaction is completed, the power management function remains outstanding. Based on at least the foregoing, the functionality provided by the embodiments of the present disclosure provide significant enhancement memory device technologies including providing context awareness to the memory device that may be utilized to effectively conduct power management in the memory device.

Referring now also to FIG. 1, FIG. 1 illustrates an exemplary architecture for a memory device 102 and host device 103 that may be utilized to support usage model context aware power management in secure systems with embedded hardware security modules in accordance with embodiments of the present disclosure. The memory device 102 and other componentry illustrated in the Figures may belong to a system 100. In certain embodiments, the memory device 102 is, for example, an SSD, eMMC, memory card, or other storage device, or a NAND-based flash memory chip or module that is capable of encoding and decoding stored data, such as by utilizing an encoder 160 and decoder 162 of the memory device 102. In certain embodiments, the memory device 102 may include any amount of componentry to facilitate the operation of the memory device 102. In certain embodiments, for example, the memory device 102 may include, but is not limited to including, a non-volatile memory 104, which may include any number of memory blocks, such as memory block 120 (e.g., Block A), a memory interface 101, a controller 106 (which may include the encoder 160 and a decoder 162), any other componentry, or a combination thereof. The memory device 102 may communicatively link with a host device 103, which may be or include a computer, server, processor, autonomous vehicle, any other computing device or system, or a combination thereof.

In certain embodiments, the controller 106 of the memory device 102 may be configured to control access to the non-volatile memory 104. In certain embodiments, user data 130 is provided by controller 106 to non-volatile memory 104, such as by utilizing memory interface 101. For example, the user data may be obtained from the host device 103 to be stored in the non-volatile memory 104, such as in memory block 120. In certain embodiments, the controller 106 may include an encoder 160 for generating ECC data (e.g., such as when writing data to the non-volatile memory 104), and decoder 162 for decoding ECC data (e.g., when reading data, such as from the non-volatile memory 104). In certain embodiments, the controller 106 may include firmware 150, which may be configured to control the components of the system 100. In certain embodiments, the firmware 150 may be configured to control access to the non-volatile memory 104 by the host device 130 and control the operative functionality of the memory device 102. Further details relating to the firmware 150 are discussed below. In certain embodiments, the controller 160 of the memory device 102 may be configured to include a status register 160. In certain embodiments, the status register 160 may be configured include status bits that may be utilized to notify the host device 103 that an impending move to lower power or standby mode has bene postponed and outstanding.

As indicated above, the memory device 102 may be configured to receive data (e.g., user data) to be stored from host device 103 (e.g., over a serial communications interface, or a wireless communications interface). In certain embodiments, the user data 130 may be video data from a device of a user, sensor data from one or more sensors of an autonomous or other vehicle, text data, audio data, virtual reality data, augmented reality data, information, content, any type of data, or a combination thereof. In certain embodiments, memory device 102 may be configured to store the received data in memory cells (not explicitly shown) of non-volatile memory 104. In one example, the memory cells may be provided by one or more non-volatile memory chips. In one example, the memory chips may be NAND-based flash memory chips, however, any type of memory chips or combination of memory ships may also be utilized.

In certain embodiments, the system 100 and memory device 102 may include a power management subsystem 135. In certain embodiments, the power management subsystem 135 may be configured to contain and execute power management functions and algorithms to adjust power delivered or supplied to the memory device 102. For example, the power management subsystem 135 may be configured to utilize a power management function to transition the memory device 102 from a fully functional (e.g., full power) mode to a low power or standby mode. In certain embodiments, the power management subsystem 135 may be configured to transition the memory device 102 from a low power or standby mode to a fully functional (e.g., full power) mode. In certain embodiments, the power management subsystem 135 may be configured to transition the memory device 102 from a low power or standby mode or from the fully functional mode to an intermediate power mode that provides power greater than low power or standby mode, but less power than fully functional mode. In certain embodiments, the power management subsystem 135 may be configured to function based on the context awareness of the memory device 102. For example, if a transaction from a host device 103 for the memory device 102 involves the use of cryptographic services (e.g., a secure read transaction), the memory device 102 may be in a context awareness state and may postpone impending execution of a power management function to transition the memory device from a full power mode to a standby or low power mode until the transaction is completed. In certain embodiments, flags may be set by the firmware 150 or modules (e.g., usage model context awareness module 152, context aware power module, etc.) based on the detected context of a transaction initiated by the host device 103 to the memory device 102, and the flags may be utilized to indicate that the transaction requires more power than would be provided in low power mode or standby mode. As a result, the flags may be utilized to ensure the power management function does not execute of the memory device 102 firmware 150 determines that the transaction needs to be executed before power to the memory device 102 is disrupted by the power management subsystem 135.

In certain embodiments, the memory device 102 may include any number of hardware security modules (HSMs) 138. In certain embodiments, the HSM 138 may include an interface that facilitates communications to and from the host device 103. In certain embodiments, the interface can comprise a Peripheral Component Interconnect Express (PCIe) interface or other interface. In certain embodiments, the interface can comprise other similar types of interfaces such as a Non-Volatile Memory Express (NVMe), NVMe over Fiber (NVMeOF), Serial Peripheral Interface (SPI), or similar bus. In certain embodiments, HSM 138 may be configured to receive commands from host device 103, such as via interface 101 or its own interface. In certain embodiments, commands can comprise commands to be executed in a secure manner. For example, the commands can comprise commands to generate or derive cryptographic keys, read cryptographic keys, encrypt or decrypt data, generate digital signatures, etc. In certain embodiments, any commands currently executable by existing HSMs can be received via interface 101.

In certain embodiments, the HSM 138 may include volatile storage area. In certain embodiments, the volatile storage area can comprise any type of memory that loses its data when powered off. For example, the volatile storage area can comprise a dynamic random-access memory (DRAM), static random-access memory (SRAM), or similar types of volatile storage area technologies. In certain embodiments, the HSM 138 may utilize the volatile storage area to store cryptographic data (e.g., keys, seeds, results, authentication information, identities, etc.). In certain embodiments, since the volatile storage area may lose data when powered off, the HSM 138 may not persistently store sensitive data when powered off. In certain embodiments, the volatile storage area can comprise a register file or may comprise a DRAM or SRAM and one or more registers.

In an embodiment, HSM 100 may include a PUF 140. In certain embodiments, the PUF 140 may comprise a physical hardware circuit that exploits inherent randomness introduced during manufacturing to give a physical entity a unique 'fingerprint' or trust anchor. In certain embodiments, the PUF 140 may produce a consistent and repeatable value. In certain embodiments, the PUF 140 may comprise a SRAM PUF, Delay PUF, or any other PUF technology implemented on the HSM 138. In certain embodiments, the HSM 138 may create a PUF 140 from a portion of uninitialized memory space in the volatile storage area that is not subsequently used for any other purpose. Thus, the PUF 140 value may be related to the random value of the portion of the memory space in the volatile storage area. In certain embodiments, by not storing keys, the HSM 138 may not be susceptible to offline attacks. Further, in certain embodiments, security requirements can be relaxed since keys are only stored in volatile storage area and not persistent memory.

Figure 2:
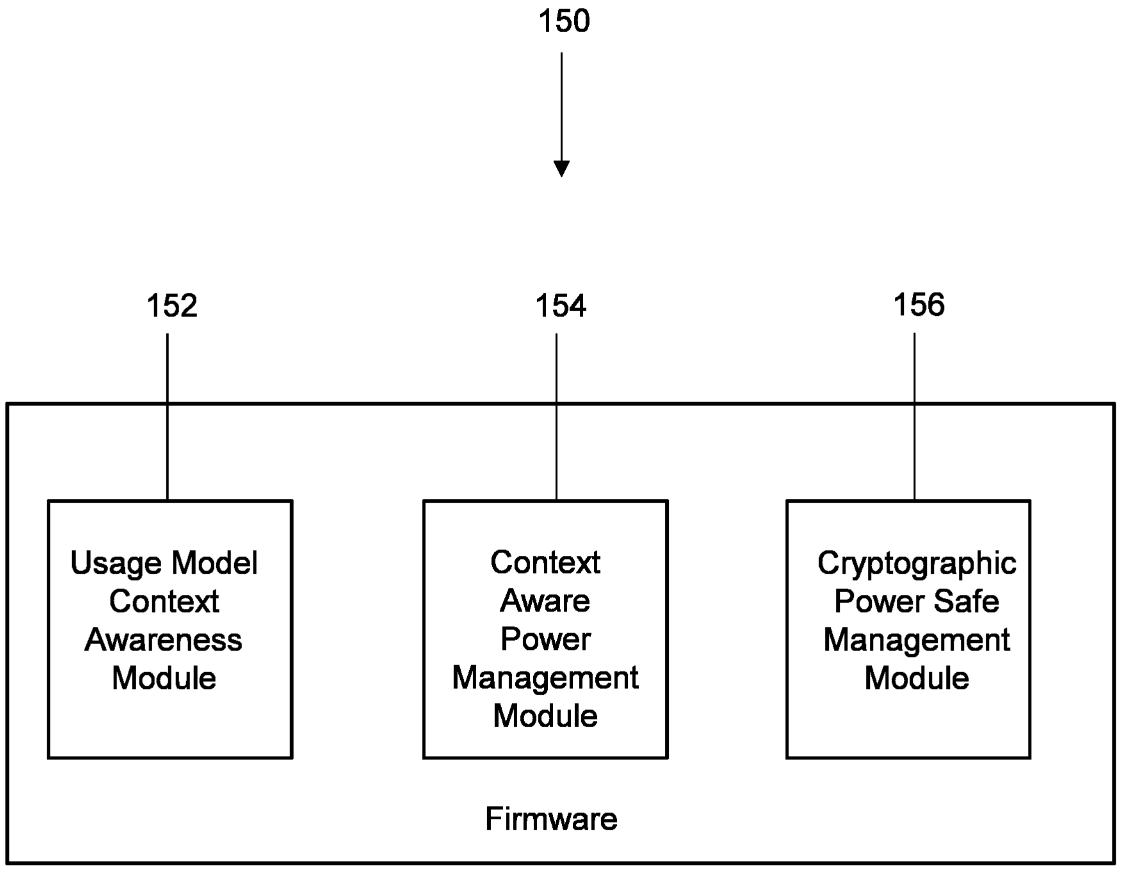
FIG. 2 shows a usage model context awareness module, a context aware power management module, and a cryptographic power safe management module for use with firmware of a memory device in accordance with embodiments of the present disclosure.

Referring now also to FIG. 2, the firmware 150 of the memory device 102 may be configured to control the operative functionality of the memory 102. In certain embodiments, the firmware 150 may be configured to manage all operations conducted by the controller 106. In certain embodiments, the firmware 150 may be configured to set flags that may put the firmware 150 or modules of the firmware 150 into a context awareness mode, such as when a transaction initiated by the host device 103 for the memory device 102 is determined by the firmware 150 to require cryptographic services (e.g., security functions to support secure operations associated with the transaction). In certain embodiments, the firmware 150 may include a usage model context awareness module 152 (UMCA) that may contain logic that is configured to detect a context in which a transaction is initiated by a host device 103. Based on the detected context, the usage model context awareness module 152 may be utilized to set certain conditions within its internal data structures and state machines. These conditions may be utilized to assist the firmware 150 to become context aware. Additionally, based on the context awareness, the power management subsystem 135 may be configured to function and be controlled. In certain embodiments, the usage model context awareness module 152 may be configured to keep track of secure transactions that may require cryptographic services or functionality for completeness of the requested transaction operations. Having this knowledge, the usage model context awareness module 152 may be configured to set flags and indicators in the code to back off the power management subsystem from executing power management functions to adjust the power level of the memory device (e.g., preventing a transition from full power to low power or standby mode).

In certain embodiments, the context aware power management module 154 (CAPM) may reside within the firmware 150. The context aware power management module 154 may be configured to depend on the usage model context awareness module 150 context. In certain embodiments, when the foundation of the context awareness is determined by the firmware 150, the firmware 150 may be configured to ascertain the current context and depending on the requirement for cryptographic services for completing a transaction in the current context, may set internal data structures according to the context. In certain embodiments, when the power management system 135 is triggered asynchronously, the context aware power management module 154 may be triggered and may decide whether to allow or disallow an impending power management action (e.g. moving to low power or standby mode from fully functional mode) depending on the type of transaction initiated by the host device 103. In certain embodiments, the decision is to allow the execution of the power management function, the firmware 150 may be configured to reject any host command (and transaction) during the transition from power states that may require cryptographic services or other services requiring more power than utilized for standby mode or low power mode. After the transition is complete and the memory device 102 enters the low power or standby mode, algorithms utilized to get the memory device 102 back into functional (e.g. full power) mode may be applied. In certain embodiments, when the memory device 102 comes back from lower low power or standby mode and there is a requirement of cryptographic function usage for a transaction, the firmware 150 may ensure that appropriate checks are utilized to ensure the availability of full power to the memory hardware to support the execution of the cryptographic functions supporting the cryptographic services. In certain embodiments, if the decision is to disallow execution of the power management function, then the firmware 150 may respond to the host device 103 with a notification or indicator of an impending power state change and that the impending power state change has been postponed until the transaction is completed.

In certain embodiments, the cryptographic power safe management module 156 (CSPM) may be configured to also reside in the firmware 150. In certain embodiments, the cryptographic power safe management module 156 may be configured to ensure that enough time is provided to the internal cryptographic functions (e.g., supported and provided by by PUF 140, HSM 150, etc.) of the memory device 102 to be safely offloaded, loaded and initialized before or after execution of a power management function of the power management subsystem 135. In certain embodiments, the cryptographic power safe management module 156 may be configured to provide enough time for cryptographic functions that need a physical memory for PUF-related functions. In certain embodiments, parameters for time delays, retry mechanisms, etc. may be drawn based on the context learning by the usage model context awareness module 152 of the firmware 150. In certain embodiments, when an impending power management state change from full power mode to low power or standby mode is detected by the firmware 150, the context aware power management module 154 may prevent the power management function of the power management subsystem 135 from being executed and the host device 103 may be notified by status bits of the status register 164 that an impending power management event (e.g., change in power mode) has been postponed, such as to execute an transaction requiring full power mode. In certain embodiments this may happen to let the host device 103 know that until the context associated with secure transaction requiring cryptographic services is over with, the power management function remains outstanding.

Figure 3:
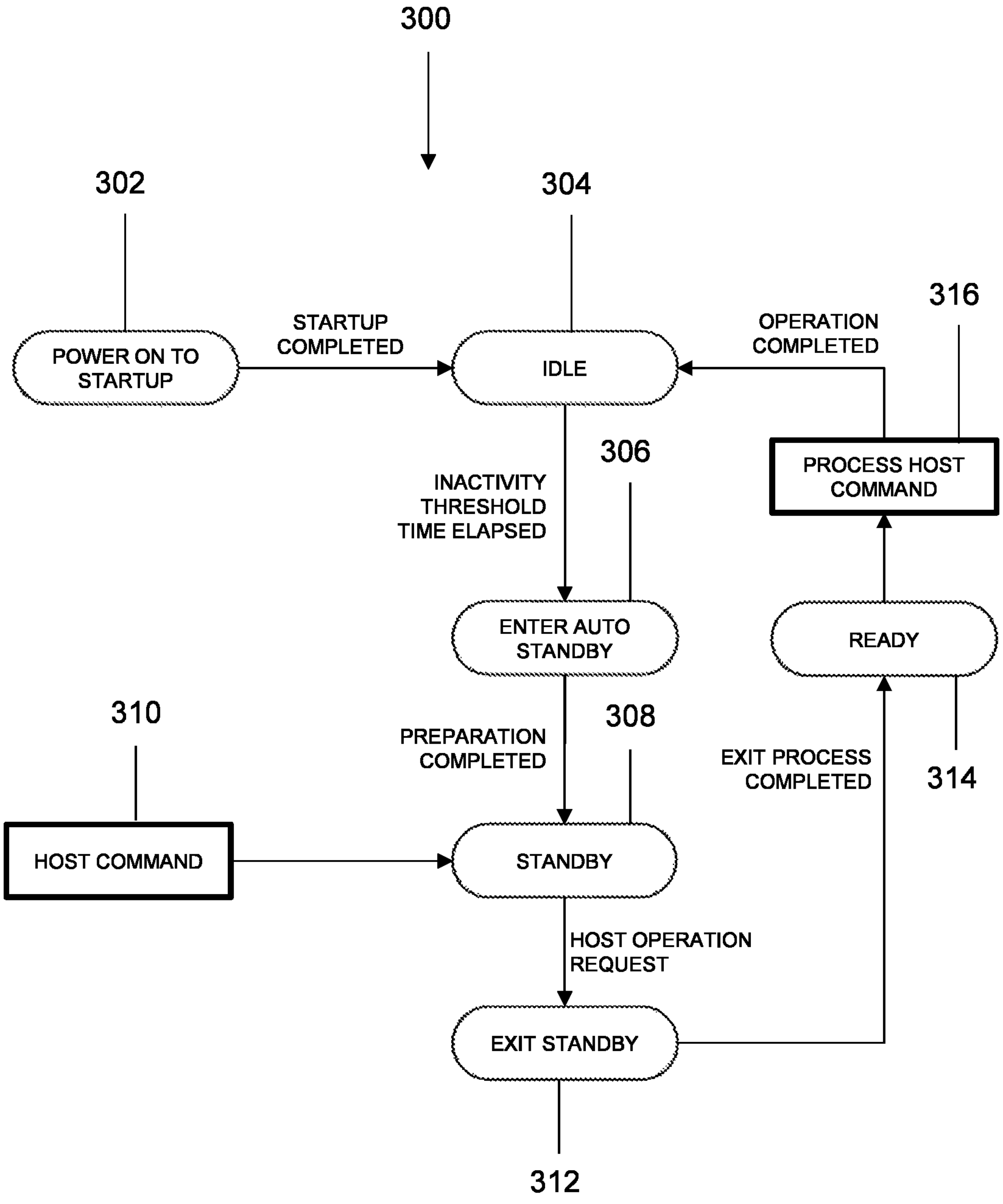
FIG. 3 illustrates an exemplary firmware state flow in accordance with embodiments of the present disclosure.

Referring now also to FIG. 3, an exemplary firmware state flow in accordance with embodiments of the present disclosure is shown. In certain embodiments, at 302, the memory device 102 may be in powered on state to startup the firmware 150. When the startup is completed, at 304, the firmware 150 may enter an idle state. Once an inactivity threshold time has elapsed, the firmware 150 may be configured to enter an auto standby mode 306 state. Preparation for entering the auto standby mode may occur and once it is completed, the firmware 150 may enter the standby state at 308. At 310, a host command 310 may be received, such as from the host device 103, which may cause the state to transition, at 312, to an exit standby state. Once the exit process is completed, the firmware 150 may enter a ready state at 314. At 316, the firmware 150 may be configured to process the received host command and once the operation is completed, the firmware 150 may go back to the idle state 304.

Figure 4:
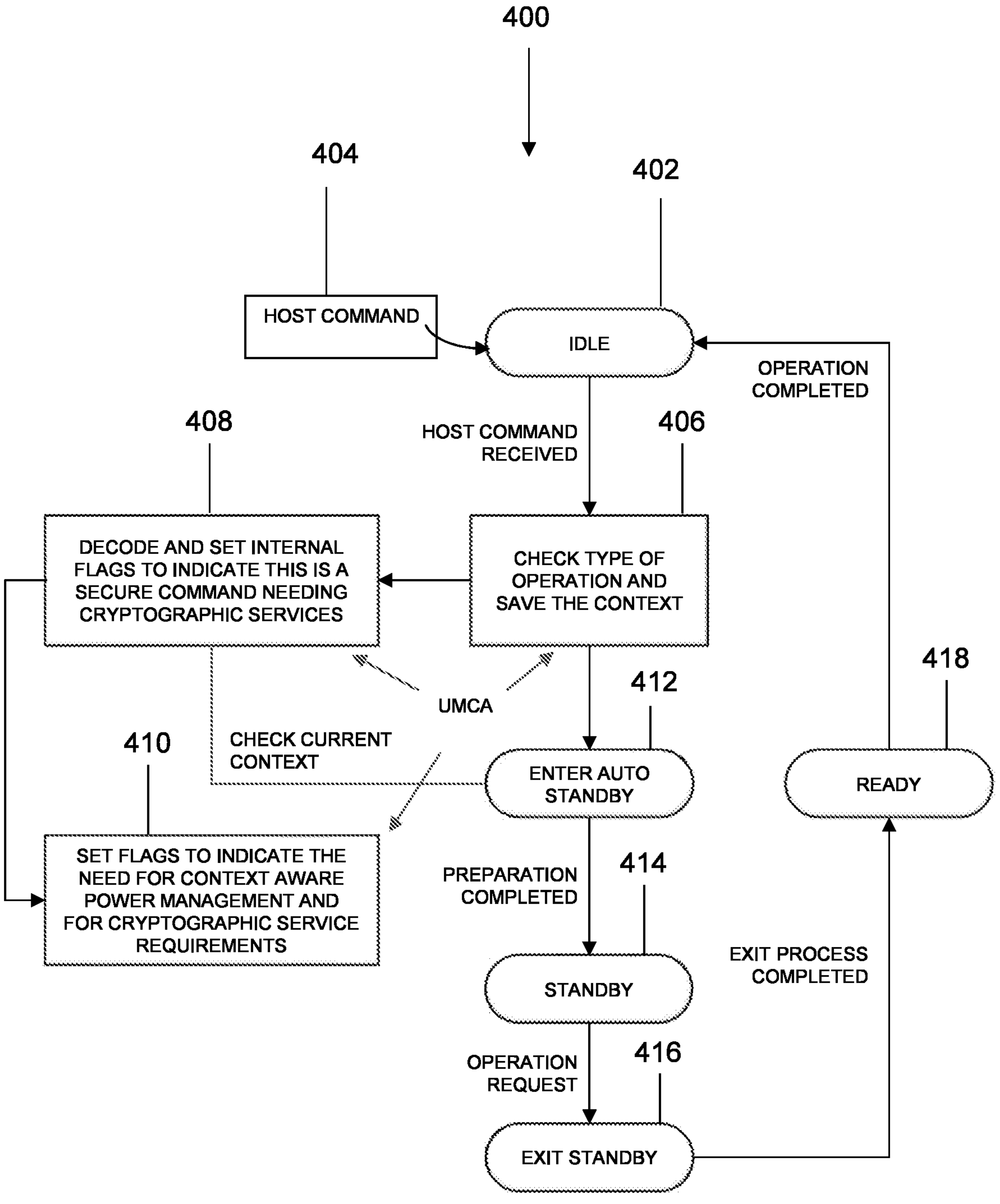
FIG. 4 illustrates a flow associated with a usage model context awareness module according to embodiments of the present disclosure.

Referring now also to FIG. 4, an exemplary firmware state flow associated with saving a context of an operation using a usage model context awareness module 152 according to embodiments of the present disclosure is shown. At 402, the firmware 150 may be in an idle state. At 404, a host command associated with performing a transaction with a memory device 102 may be issued. Once the host command is received, the firmware 150 may check the type of operation for the transaction and save the context at 406. For example, the firmware 150 may determine (e.g., by utilizing the usage model context awareness module 152) if the operation for the transaction is a normal operation (e.g., not requiring full power for the memory device 102 or a secure operation that may require full power) or a secure operation. At 408, the firmware 150 may be configured to decode and set internal flags to indicate that the operation is a secure transaction requiring cryptographic services (e.g., such as those provided by PUF 140). At 410, the firmware 150 may set flags to indicate the need for context aware power management and for cryptographic service requirements. At 412, the firmware 150 may be configured to check current context parameters and enter auto standby mode and, once preparation is completed, the firmware 150 may enter standby mode 414. Based on the operation associated with a transaction, the firmware 150 may then exit, at 416, the standby mode. Once the exit process is completed, the firmware 150 may enter a ready state at 418, and once the operation for a transaction is completed, the firmware 150 may reenter the idle state at 402.

Figure 5:
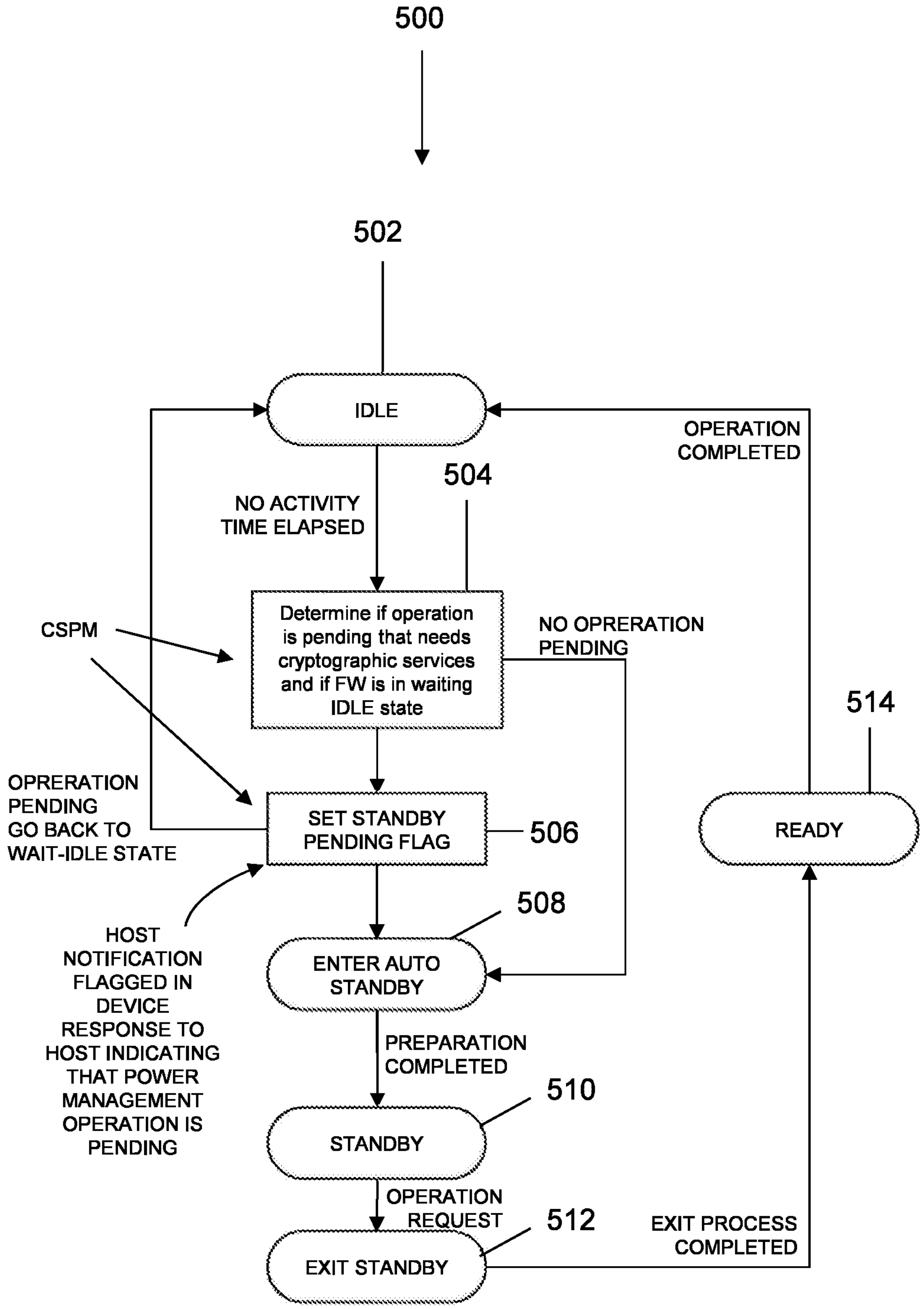
FIG. 5 illustrates a flow associated with a cryptographic power safe management module and host notification according to embodiments of the present disclosure.

Referring now also to FIG. 5, an exemplary flow associated with a cryptographic power safe management module 156 and host notification according to embodiments of the present disclosure are shown. The flow may serve as a standby backoff mechanism. At 502, the firmware 150 may be in an idle state. At 504, the firmware 150 may determine if an operation for a transaction is pending that needs cryptographic services and if the firmware 150 is waiting in the idle state. If there is no operation pending, the firmware 150 may proceed to the enter standby state at 508. If there is an operation pending to be executed, the firmware 150 may go back to a wait-idle state. At 506, the firmware 150 may set a standby pending flag and a host notification may be flagged in the memory device response to the host device 103 indicating that a power management operation is pending. The firmware 150 may proceed to enter auto standby state at 508 and once preparation is completed, may enter the standby state at 510. Based on the operation for a transaction, the firmware 150 may enter an exit standby state at 512 and once the exit standby process is completed, the firmware 150 may enter a ready state 514. The operation for the transaction may be completed and the firmware 150 may enter the idle state 502.

Figure 6:
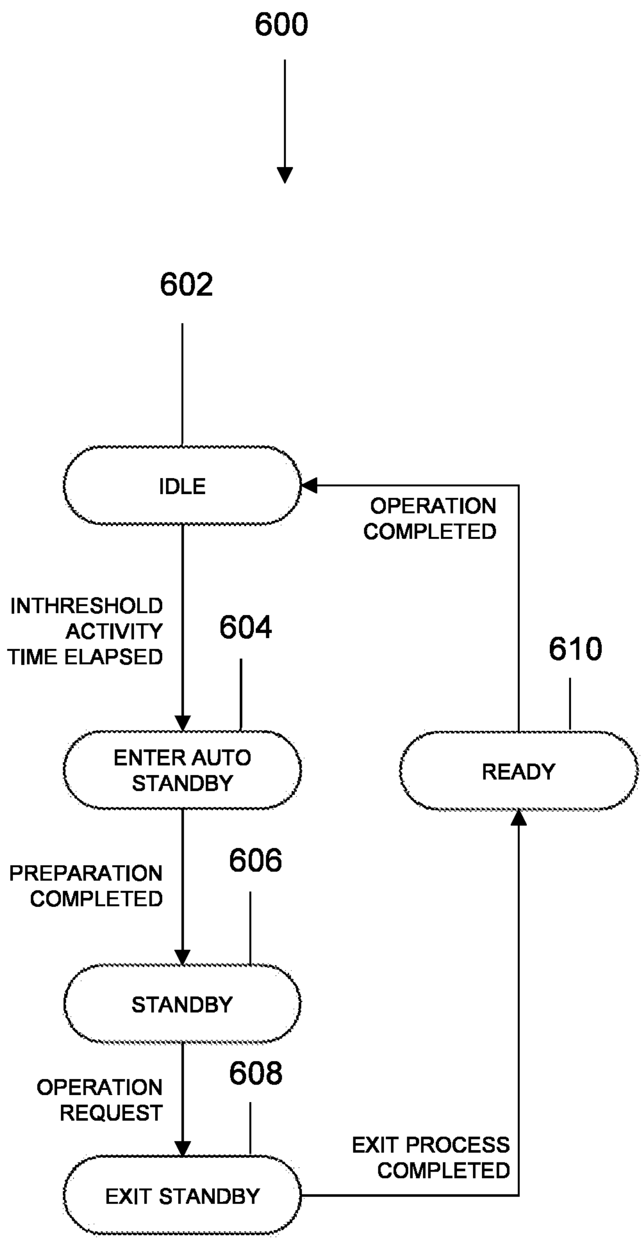
FIG. 6 illustrates a flow for simplified power management according to embodiments of the present disclosure.

Referring now also to FIG. 6, an exemplary flow for simplified power management according to embodiments of the present disclosure is shown. The flow may be a mechanism of simplified power management. At 602, the firmware 150 of the memory device 102 may be in an idle state. An in threshold activity time may have elapsed and the firmware 150 may enter an auto standby state at 604. Once preparation is completed, the firmware 150 may enter a standby state 606. If there is an operation for a transaction, the firmware, at 608, may enter an exit standby state and once the exit process is completed, the firmware 150 may enter a ready state. The operation may then be completed and upon completion the firmware 150 may enter the idle state at 602.

Figure 7:
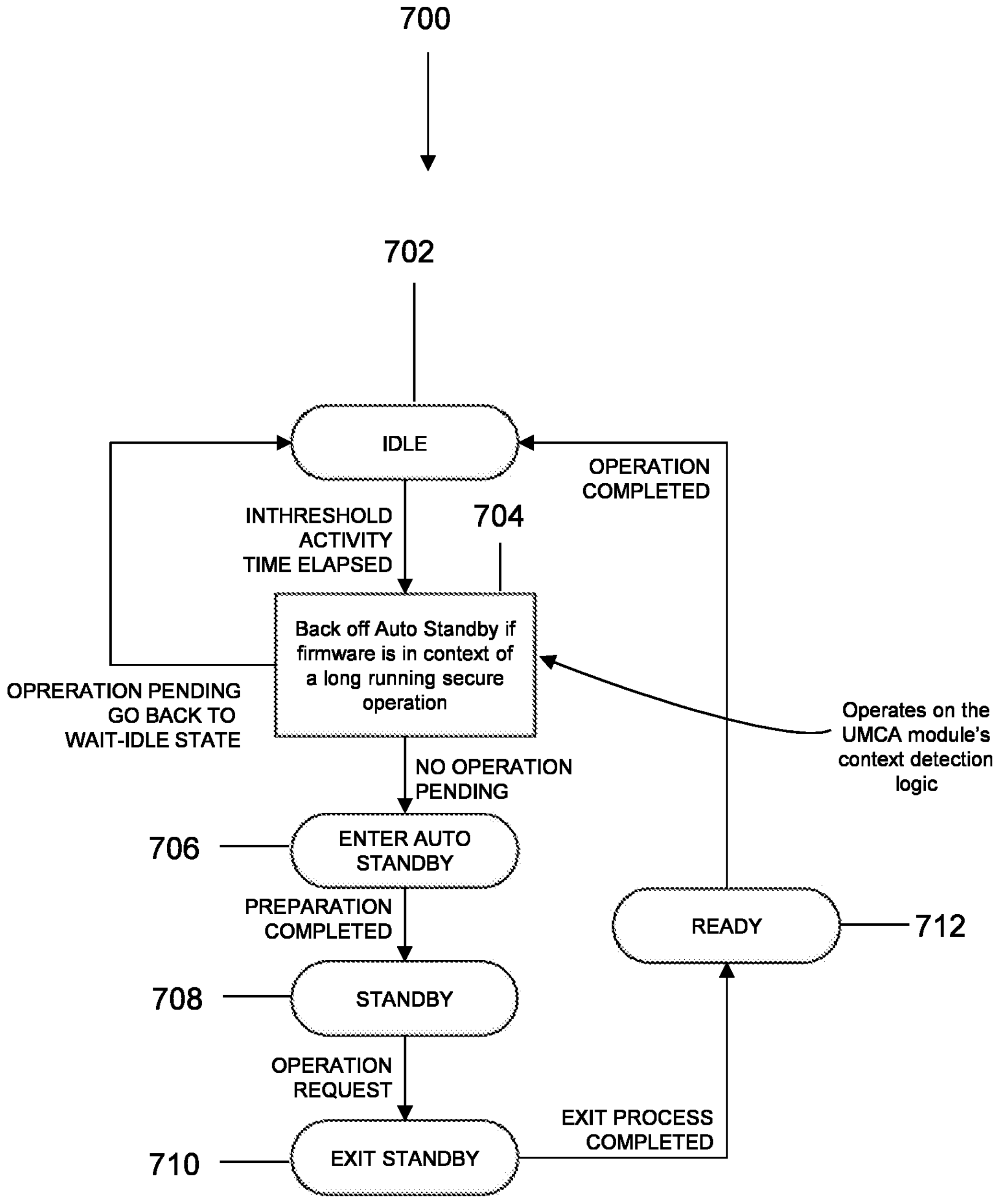
FIG. 7 illustrates a flow for providing power management based on session awareness according to embodiments of the present disclosure.

FIG. 7 illustrates a flow for providing power management based on session awareness according to embodiments of the present disclosure. The flow may provide for backing off power management based on context awareness for a session involving an operation for a transaction to be conducted using the memory device 102. At 702, the firmware 150 may be in an idle state. An in threshold activity time may have elapsed, and, at 704, the firmware 150 may back off auto standby if the firmware 150 is in the context of a secure operation (e.g., long running secure operation) requiring cryptographic services requiring full power to the memory device 102. If there is an operation pending, the firmware 150 may go back to wait idle state at 602 and, in certain embodiments, may proceed with processing of the operation. If, at 704, there is no operation pending, the firmware 150, at 706, may enter an auto standby state 706. Once preparation is completed, the firmware 150 may enter a standby state 708. Upon receipt of a transaction requiring an operation (e.g., via a command from a host device 103), the firmware 150 may proceed to an exist standby state at 710. Once the exit process is completed, the firmware 150 may enter a ready state at 712. The operation may then be completed and the firmware 150 may enter the idle state 702.

Figure 8:
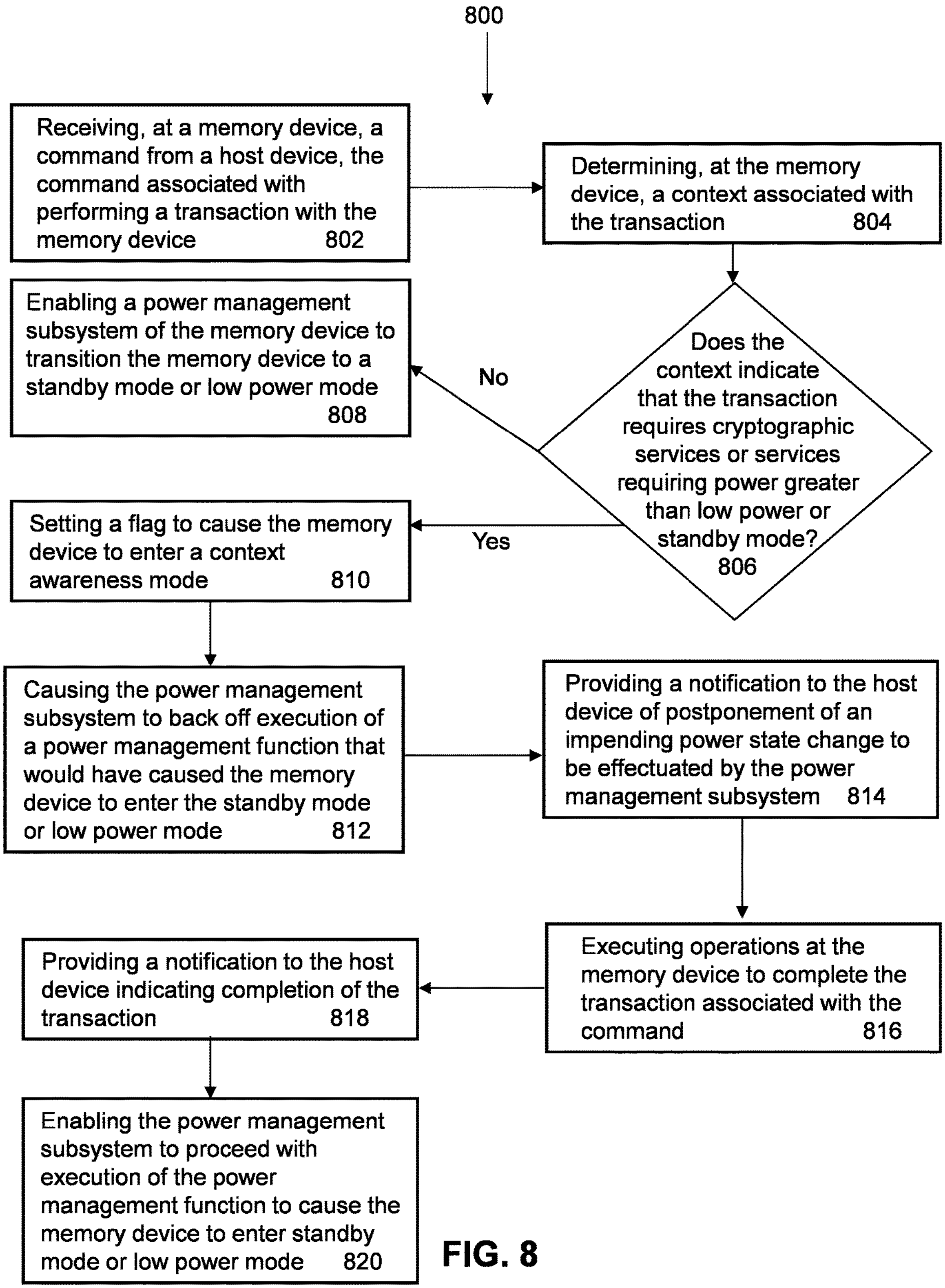
FIG. 8 illustrates a method for providing usage model context aware power management in secure systems with embedded hardware security modules in accordance with embodiments of the present disclosure.
Figure 9:
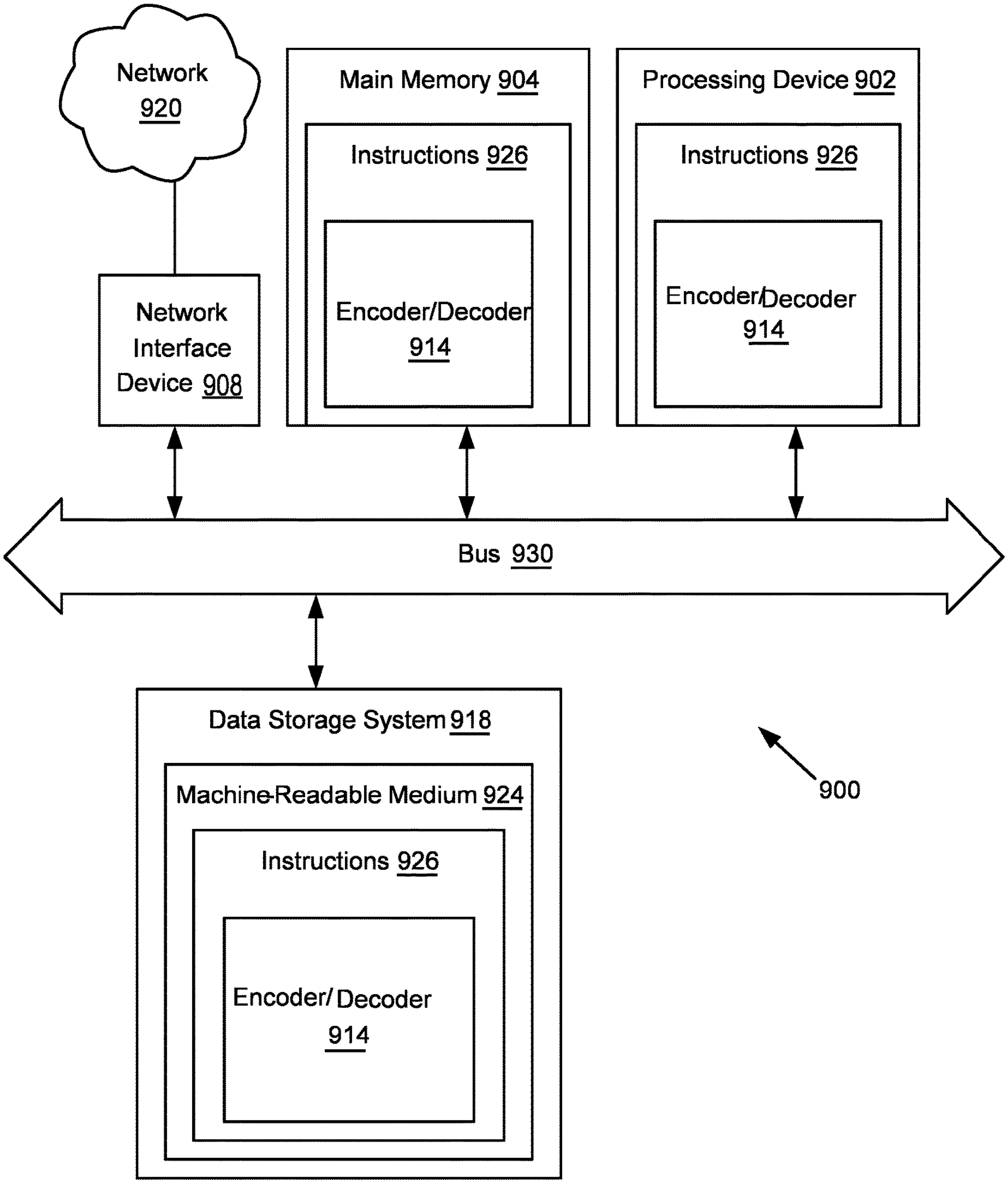
FIG. 9 illustrates a schematic diagram of a machine in the form of a computer system within which a set of instructions, when executed, may cause the machine to facilitate functionality supporting usage model context aware power management according to embodiments of the present disclosure.

Referring now also to FIG. 8, FIG. 8 illustrates a method 800 for providing usage model context aware power management in secure systems with embedded hardware security modules according to embodiments of the present disclosure. For example, the method of FIG. 8 can be implemented in the system 100 of FIG. 1 and any of the other systems or devices illustrated in the Figures. In certain embodiments, the method of FIG. 8 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 8 may be performed at least in part by one or more processing devices (e.g., controller 106 of FIG. 1). Although shown in a particular sequence or order, unless otherwise specified, the order of the processes may be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 800 may include steps for providing context awareness to a memory device (e.g., to the firmware of the memory device) as it relates to transactions initiated by a host device (e.g., host device 103) for the memory device and to reduce potential power management disruptions that may occur during execution of operations for the transactions. In certain embodiments, the method 800 may be performed by utilizing the system 100, by utilizing any combination of the componentry contained therein, or a combination thereof. At step 802, the method 800 may include receiving a command from a host device (e.g., host device 103) at a memory device (e.g., memory device 102). The command, for example, may be associated with performing a transaction with the memory device. In certain embodiments, a transaction may include, but is not limited to, a read transaction, a write transaction, a memory access transaction, an erase transaction, a secure read transaction, a secure write transaction, a secure erase transaction, a transaction to modify a security parameter of the memory device, a transaction to manage the security parameter of the memory device, a request response secure transaction, an atomic secure transaction, any other type of transaction, or a combination thereof. In certain embodiments, the command may be received by the memory device 102, such as by a controller (e.g., controller 106) of the memory device 102. As an example, the command may be to conduct a transaction involving securely writing data to the memory device 102.

At step 804, the method 800 may include determining a context associated with the transaction associated with the command. In certain embodiments, the context may indicate the type of transaction or operation that is to be conducted between the memory device and the host device. For example, the context may indicate whether the transaction or operation is a normal operation (or transaction) or a secure operation (or transaction), which may require cryptographic services of the memory device. In certain embodiments, a normal operation may be an operation that potentially may be executed while the memory device is in a low power mode or standby mode and may not necessarily require full power to the memory device. In certain embodiments, a secure operation may be an operation that may need to have the memory device operating at full power or at least power greater than provided at standby mode or low power mode. At step 806, the method 800 may include determining if the context indicates that the transaction requires cryptographic services or other services requiring power greater than provided during low power mode or standby mode. If the context indicates that the transaction does not require cryptographic services (e.g., a normal read operation not requiring cryptographic services) or services requiring power greater than provided during low power or standby mode, the method 800 may proceed to step 808, which may include enabling a power management subsystem (e.g., power management subsystem 135) to execute a power management function to transition the memory device to a standby mode or a low power mode. If, however, at step 806, the context indicates that the transaction does require cryptographic services (e.g. the transaction involves a secure read or write operation requiring cryptographic services) or services requiring power greater than provided during low power or standby mode, the method 800 may proceed to step 810.

At step 810, the method 800 may include setting one or more flags, such as within the firmware of the memory device, to cause the memory device to enter a context awareness mode. For example, the firmware 150 may be configured to enter the context awareness mode upon detection that the context of the transaction requires cryptographic services or other services requiring power greater than provided for standby mode or low power mode. At step 812, the method 800 may include causing the power management subsystem (e.g., power management subsystem 135) to back off execution of a power management function that would have cause the memory device to enter the standby mode or low power mode. In certain embodiments, backing off the execution of the power management function may prevent description of execution of the operations required to complete the transaction requested by the host device via the host command issued to the memory device. At step 814, the method 800 may include providing a notification to the host device indicating postponement of an impending power state change to be effectuated by the power management subsystem. For example, if the power management subsystem typically executes (e.g., according to a schedule) a power management function to reduce power to standby mode or low power mode at a specific time each day to the memory device, the memory device (e.g., such as by having the firmware 150 transmit a signal to the power management subsystem 130) may back off from transitioning to the low power mode or standby mode until execution of the operations to complete the transaction is performed.

At step 816, the method 800 may include executing one or more operations at the memory device to process and complete the transaction requested via the command of the host device. For example, of the transaction required cryptographic services and was a secure read operation, the memory device may be maintained in full power (or with enough power) to execute the cryptographic services required for the transaction. For example, the PUF 140 of the hardware security module 138, which may require full power to the memory device 102 to effectively derive authentication keys and identities (e.g., keys and identities to authenticate the host device to communicate with the memory device) to conduct the secure read operation, may be activated to support execution of the secure read operation. At step 818, the method 800 may include providing a notification to the host device indication completion of the operations to complete the transaction. For example, the firmware 150 of the controller 106 may transmit a signal via the memory interface 101 to the host device 103 to provide the notification to the host device 103. At step 820, the method 800 may include enabling the power management subsystem to proceed with execution of the power management function to cause the memory device to enter the standby mode or low power mode after the transaction is completed. The method 800 may repeated as necessary as new transactions are initiated by the host device 103 to the memory device 102. Notably, the method 800 may incorporate any of the other functionality as described herein and may be adapted to support the functionality of the system 100 or as otherwise described herein.

FIG. 6 illustrates an exemplary machine of a computer system 600 within which a set of instructions, for causing the machine to perform any one or more of the methodologies discussed herein, can be executed. In certain embodiments, the computer system 600 can correspond to a host system or device (e.g., the host device 103 of FIG. 1) that includes, is coupled to, or utilizes a memory system (e.g., the memory device 102 of FIG. 1). In certain embodiments, computer system 600 corresponds to memory device 102, host device 103, or a combination thereof. In certain embodiments, the machine may be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment. In certain embodiments, the machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In certain embodiments, the exemplary computer system 600 may include a processing device 602, a main memory 604 (e.g., read-only memory (ROM), flash memory, dynamic random-access memory (DRAM) such as synchronous DRAM (SDRAM) or Rambus DRAM (RDRAM), static random-access memory (SRAM), etc.), and/or a data storage system 618, which are configured to communicate with each other via a bus 630 (which can include multiple buses). In certain embodiments, processing device 602 may represent one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets, or processors implementing a combination of instruction sets. In certain embodiments, the processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. For example, the processing device 602 may be configured to perform steps of flows 300, 400, 500, 600, 700 and the method 800 and support functionality provided by the system 100. For example, the computer system 600 may be configured to store and process state information for the memory device 102, context information for transactions (e.g., transactions initiated by the host device 103), cryptographic keys, authentication information, and other information utilized or generated by the system 100. As another example, in certain embodiments, the computer system 600 may assist with conducting the operative functionality of the power management subsystem 135. In certain embodiments, computer system 600 may further include a network interface device 608 to communicate over a network 620.

The data storage system 618 can include a machine-readable storage medium 624 (also referred to as a computer-readable medium herein) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory device 102, the non-volatile memory system 210, or a combination thereof.

Reference in this specification to "one embodiment" "an embodiment" or "certain embodiments" may mean that a particular feature, structure, or characteristic described in connection with the embodiment is included in at least one embodiment of the disclosure. The appearances of the phrases "in one embodiment" and "in certain embodiments" in various places in the specification are not necessarily all referring to the same embodiment(s), nor are separate or alternative embodiments mutually exclusive of other embodiments. Moreover, various features are described which may be exhibited by some embodiments and not by others. Similarly, various requirements are described which may be requirements for some embodiments, but not other embodiments.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:

a host device; and a memory device configured to store data, the memory device comprising;

a power management subsystem; and a controller configured to;

receive a first command from the host device, wherein the first command is associated with performing a transaction associated with the memory device;

determine a context associated with the transaction, wherein the context indicates whether the transaction requires a security service provided by the memory device, the security service being dependent on device hardware of the memory device and requiring power greater than provided during a standby mode or a low power mode;

determine whether to allow execution of a power management function of the power management subsystem of the memory device;

reject the first command if execution of the power management function is allowed by the controller and if the context indicates that the transaction requires the security service and greater than a threshold amount of power is required for a cryptographic function of the security service; and provide, if execution of the power management function is not allowed by the controller, a notification to the host device indicating postponement of an impending power state change for the memory device until completion of the transaction.

2. The system of claim 1, wherein the controller is further configured to set a flag based on the context associated with the transaction to provide awareness of the context to a firmware of the memory device.

3. The system of claim 1, wherein the controller is further configured to, if the context indicates that the transaction requires the security service, set flags indicating that the transaction is a secure transaction, that a quantity of requests and responses are capable of occurring during handling of the secure transaction, and that a secure response is to be sent to the host device at completion of the secure transaction to conclude the secure transaction.

4. The system of claim 1, wherein the controller is further configured to facilitate triggering of the power management subsystem of the memory device asynchronously, thereby causing the controller to determine whether to allow execution of the power management function.

5. The system of claim 1, wherein the controller is further configured to facilitate reentry into a functional mode after entry into a standby mode or a low power mode.

6. The system of claim 5, wherein the controller is configured to ensure availability of sufficient power in the functional mode to support execution of the security service provided by the memory device.

7. The system of claim 1, wherein the transaction associated with the first command comprises a read transaction, a write transaction, an erase transaction, a secure read transaction, a secure write transaction, a secure erase transaction, a transaction to modify a security parameter of the memory device, a transaction to manage the security parameter of the memory device, a request response secure transaction, an atomic secure transaction, or a combination thereof.

8. The system of claim 1, wherein the controller is further configured to provide the notification to the host device of the impending power state change via a status bit in a status register of the controller.

9. The system of claim 1, wherein the controller is configured to execute the power management function to cause the memory device to enter a standby mode or a low power mode if execution of the power management function is allowed by the controller.

10. The system of claim 1, wherein the controller is configured to receive a second command associated with performing a different transaction associated with the memory device.

11. The system of claim 10, wherein the controller is configured to determine a context associated with the different transaction associated with the second command.

12. The system of claim 11, wherein the controller is configured to reject the second command if execution of the power management function is allowed by the controller and if the context indicates that the different transaction requires the security service.

13. The system of claim 11, wherein the controller is configured to provide a different notification to the host device of an impending power state change for the memory device if execution of the power management function is not allowed by the controller based on the second command.

14. A method, comprising:

receiving, at a memory device, a command from a host device, wherein the command is associated with performing a transaction associated with the memory device;

determining, by utilizing the memory device, a context associated with the transaction, wherein the context indicates whether the transaction requires a security service provided by the memory device, wherein the security service is dependent on device hardware of the memory device and requires power greater than provided during a standby mode or a low power mode;

determining, based on the context and by utilizing the memory device, whether to allow execution of a power management function of a power management subsystem of the memory device;

rejecting, by utilizing the memory device, the command if execution of the power management function is allowed by the memory device and greater than a threshold amount of power is required for a cryptographic function of the security service; and providing a notification to the host device indicating postponement of an impending power state change for the memory device until completion of the transaction if execution of the power management function is not allowed by the memory device.

15. The method of claim 14, further comprising enabling the power management system to transition the memory device to a standby mode or a low power mode if execution of the power management function is allowed by the memory device.

16. The method of claim 14, further comprising executing operations to complete the transaction if execution of the power management function is not allowed by the memory device.

17. The method of claim 16, further comprising providing a notification to the host device after executing the operations and upon completion of the transaction.

18. The method of claim 17, further comprising enabling the power management subsystem to proceed with execution of the power management function to cause the memory device to enter a standby mode or a low power mode.

19. The method of claim 18, further comprising causing the memory device to enter a context awareness mode upon detection that the context requires the security service.

20. A memory device, comprising:

a controller comprising firmware for controlling operations of the memory device, and configured to;

receive a command from a host, wherein the command is associated with performing a transaction associated with the memory device;

determine a context associated with the transaction, wherein the context indicates whether the transaction requires a security service provided by the memory device, wherein the security service is dependent on device hardware of the memory device and requires power greater than provided during a standby mode or a low power mode;

determine, based on the context, whether to allow execution of a power management function of the power management subsystem of the memory device;

provide a notification to the host device of postponement of an impending power state change for the memory device until completion of the transaction if execution of the power management function is not allowed by the controller; and facilitate execution of operations at the memory device to complete the transaction after providing the notification of the postponement of the impending power state change.

* * * * *